United States Patent [19]

Shaw

[11] 4,340,824
[45] Jul. 20, 1982

[54] AUXILIARY STEERING WHEEL COMMAND SYSTEM

[75] Inventor: Mark L. Shaw, Mesa, Ariz.

[73] Assignee: Motorola, Inc., Schaumburg, Ill.

[21] Appl. No.: 120,460

[22] Filed: Feb. 11, 1980

[51] Int. Cl.³ .......................... H04Q 1/24; H04Q 5/02
[52] U.S. Cl. ............................... 307/115; 340/825.77; 307/10 R
[58] Field of Search ........................... 307/115, 10 R; 340/147 R, 147 B, 147 C, 163

[56] References Cited

U.S. PATENT DOCUMENTS

| | | | |
|---|---|---|---|
| 2,657,286 | 10/1953 | Hoklas | 200/61.27 |
| 3,589,777 | 6/1971 | Leiber et al. | 307/115 X |
| 3,739,185 | 6/1973 | Shimizu et al. | 307/10 R |
| 3,987,392 | 10/1976 | Kugelmann | 307/360 X |
| 4,031,477 | 6/1977 | Shaw | 328/70 |
| 4,063,789 | 12/1977 | Kreisl | 339/3 S |

Primary Examiner—L. T. Hix
Assistant Examiner—Stafford D. Schreyer
Attorney, Agent, or Firm—Mark A. Kahler; James S. Pristelski; James W. Gillman

[57] ABSTRACT

This invention relates to the use of a multiplexing technique to allow for the unambiguous enabling of remotely located receiving devices. In particular, a plurality of pushbutton switches, each capable of controlling a distinct function, has a common node whose output is transmitted through the single slip-ring usually found on the steering column of an automotive vehicle. This slip-ring is normally used to conduct an electrical voltage from the horn ring to the horn control relay independent of the position of the steering wheel. The multiplexing technique disclosed herein allows for separate and independent control of not only the horn but also other functions such as a cruise control using the existing single slip-ring as the mechanism to transmit the desired signal commands. The demultiplexed signals are derived from logic circuitry located at the distal point of the slip-ring assembly.

6 Claims, 3 Drawing Figures

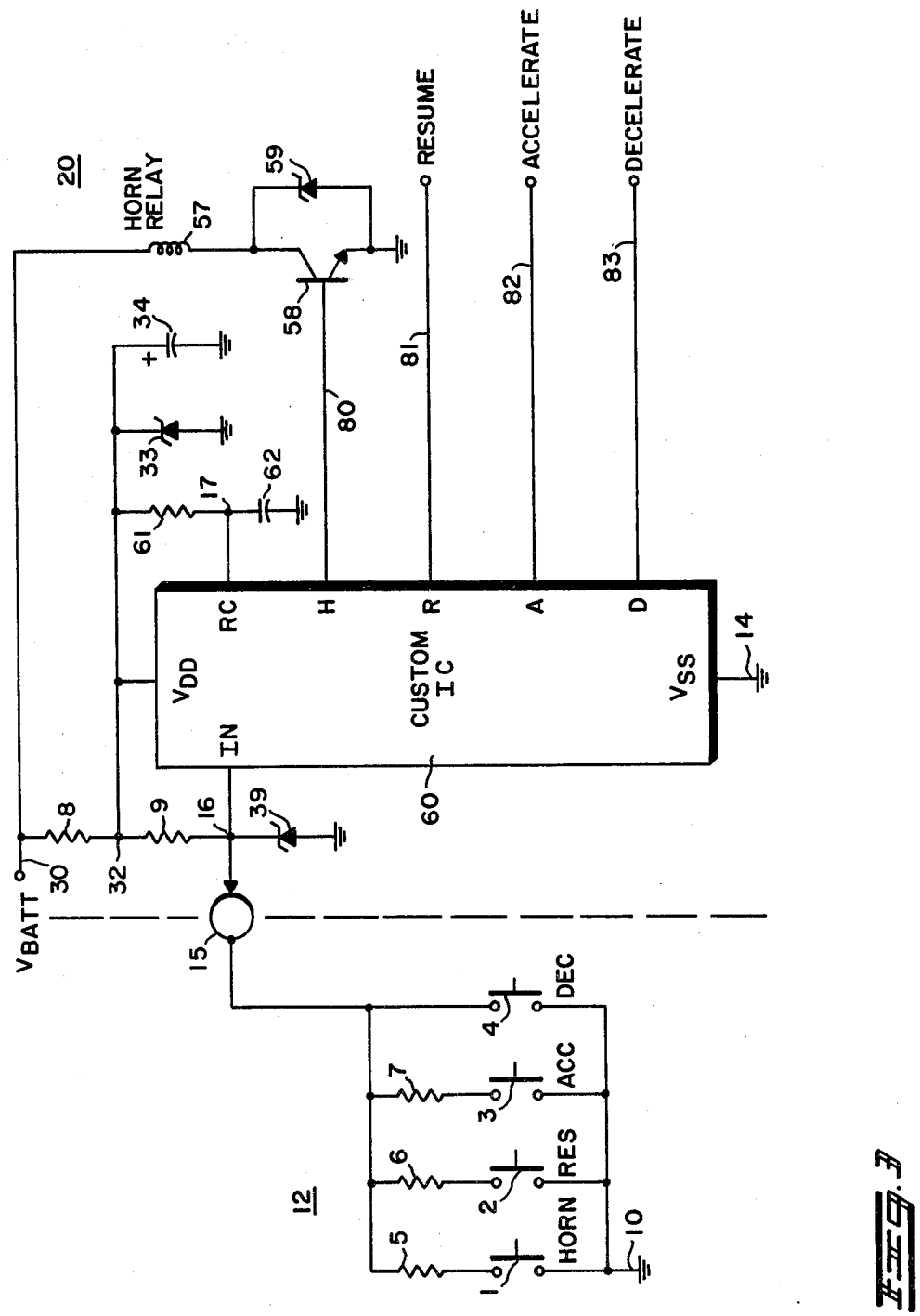

AUXILIARY STEERING WHEEL COMMAND SYSTEM

BACKGROUND OF THE INVENTION

The invention relates to a system for transmitting a selected one of a plurality of commands to be multiplexed and in particular to the use of a slip-ring for use in transmitting multiplex signals to a decoding logic.

Prior art has taught how to transfer commands over a single conductor utilizing dual threshold logic gates. Apparatus for accomplishing transmission of this type is described in U.S. Pat. No. 4,031,477 having the same inventorship as, and commonly assigned with, the instant application. It has already been recognized that a single conductor reduces the cost of a system which uses several conductors. Furthermore, it has already been demonstrated that it is desirable to control electronically an automotive cruise control system by digital logic circuitry. The instant invention is an improvement over the referenced patent and enables the use of a single slip-ring, as utilized in conjunction with transmitting a horn signal, to be used also in controlling an automotive cruise control system.

SUMMARY OF THE INVENTION

It is therefore a principal object of the present invention to provide a system for transmitting a selected one of a plurality of commands to be multiplexed via a single slip-ring.

It is a further object of the present invention to provide a system for multiplexing signals in which at least four different signals are transmitted through a single slip-ring to control at least four different output functions in a prioritized order.

It is still a further object of the present invention to improve upon the multiplexing of a plurality of signals to operate output functions, via a single slip-ring, while eliminating signal errors.

BRIEF DESCRIPTION OF THE DRAWINGS

FIG. 3 is a schematic diagram of still another embodiment of the invention functionally equivalent to FIG. 2 and incorporating a custom integrated circuit.

DETAILED DESCRIPTION OF THE INVENTION

Figure 1:
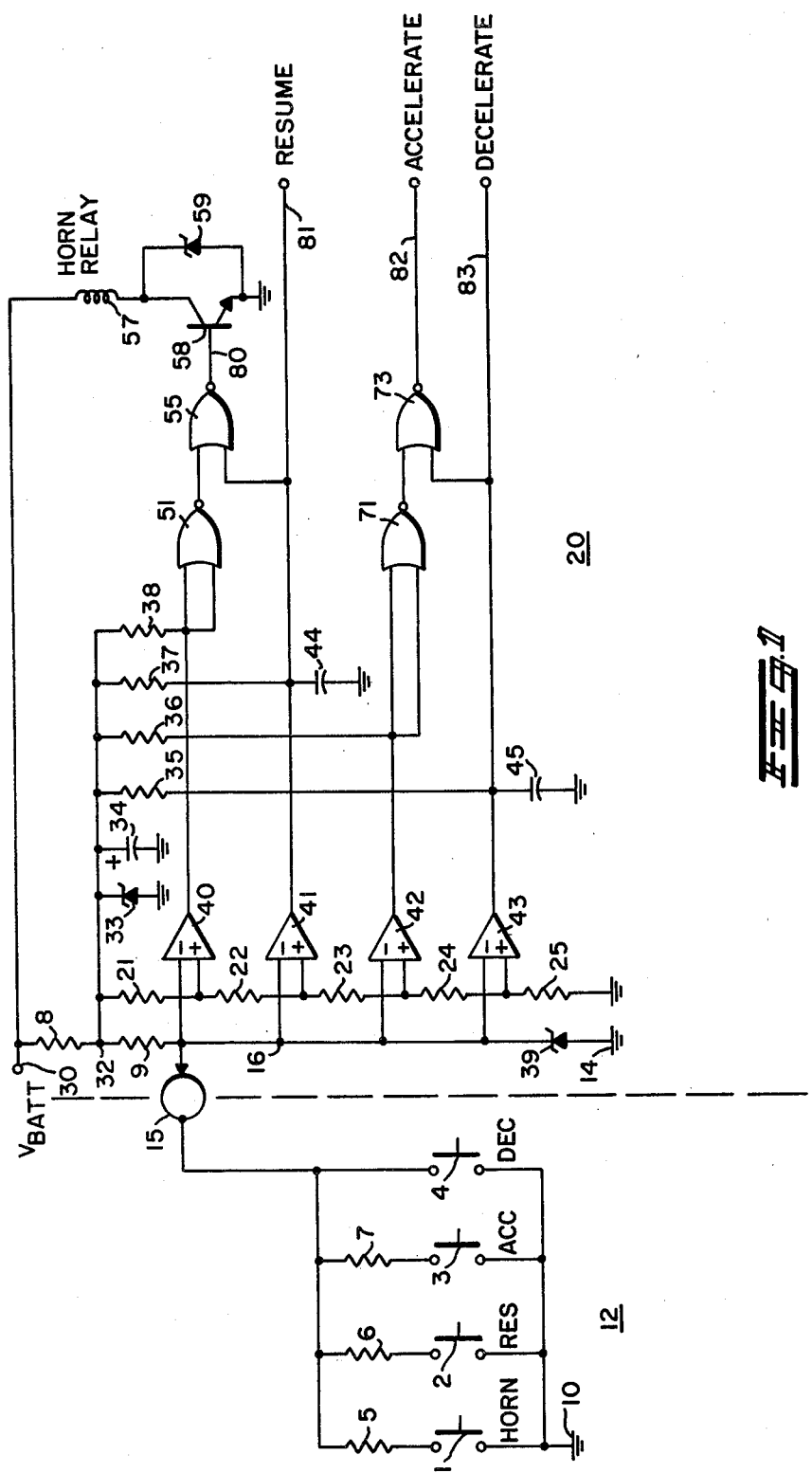
FIG. 1 is a schematic diagram according to a first embodiment of the invention.

Refer to FIG. 1. Therein a system, generally depicted, includes a signal generating circuit 12 coupled by a single slip-ring 15 to a receiving circuit 20 which receives different signals for decoding and operating an automobile horn and cruise control as will be explained more fully hereinafter. Circuit 12 includes four pushbutton switches having a common ground node 10 with switch 1 to operate the automobile horn and switches 2, 3 and 4 to operate the automobile cruise control RESUME, ACCELERATE and DECELERATE commands, respectively. Connected in series with the switches 1, 2 and 3 are resistors 5, 6 and 7, respectively, which resistors have different resistance values for a reason which will become more apparent hereinafter. Switch 4 has no series resistance connected. Switches 1-4 are connected to a detecting node 16 via a slip-ring 15 which typically is located on the steering wheel column of the automobile. A source of voltage is connected at terminal 30. Zener diode 33 is coupled to the voltage at terminal 30 through a resistor 8 to maintain a predetermined voltage at terminal 32 relative to ground node 14. The potential at nodes 10 and 14 should be similar as node 10 is affixed to the steering column and node 14 is the vehicle frame mechanically connected to the steering column. Capacitor 34 is used to filter the voltage at node 32. Coupled to this voltage at terminal 32 are four comparators 40-43 which receive the voltage signal inputs from circuit 12 at node 16 as one input. Resistors 21, 22, 23, 24 and 25 each having different resistance values appropriately selected to provide a positive voltage to the other input of the comparators 40-43 of 8 volts, 5 volts, 3 volts, and 1 volt, respectively.

It will be appreciated that the voltage signals generated by depressing switches 1-4 will have different voltage values by virtue of the differing resistors 5, 6, and 7 and node 10 for input to the negative terminals of comparators 40-43. It will be further appreciated that the comparator 43 will only have an output signal or a logical "1" when switch 4 is depressed. Similarly, the comparator 42 will only have an output signal when switch 3 or 4 is depressed and comparator 41 an output signal when switch 2, 3 or 4 is depressed and comparator 40 an output signal when any switch is depressed. Voltage "pull-up" resistors 35-38 are needed at the outputs of comparators 40-43 to provide a logical "1" when comparators 43-41, respectively, are in their logical "1" state.

The output of the comparator 40 is supplied to both inputs of NOR gate 51 which acts as a logic signal inverter. NOR gate 51 has its output connected to one input of NOR gate 55 which has its output coupled to horn command output 80 and connected to horn relay 57 via a transistor 58. Zener diode 59 is used to protect transistor 58 from an inductive transient produced by horn relay 57 when the horn enable command ceases. In a similar fashion, the output of comparator 41 is connected to the other input of NOR gate 55 and thus prevents the horn from operating when any switch, other than switch 1, is depressed. In this manner the horn is operated by depressing switch 1 but will not operate when switch 2, 3 or 4 is depressed. However, the changing voltage at node 16 may cause a spike output on the horn relay 57 as switch 2, 3 or 4 is depressed. Capacitor 44 on RESUME output 81 of comparator 41 will hold off this change at NOR gate 55 for this case.

The output at the RESUME output 81 will be active whenever switch 2, 3 or 4 is depressed. The automotive cruise control system to which this command will be connected has logical gates to ignore this command if either the ACCELERATE output 82 or DECELERATE output 83 is active.

The output of comparator 42 is coupled to NOR gate 71 which acts as a logical signal inverter and has its output coupled to one input of NOR gate 73 which will produce an output only when switch 3 is depressed. The output of comparator 43 is coupled to the other input of NOR gate 73 and thus functions to prevent the output from the NOR gate 73, connected to ACCELERATE output 82, to be active when switch 4 is depressed. Similarly, capacitor 45 connected to DECELERATE output 83 and input of NOR gate 73 slows the action of NOR gate 73 when switch 4 is depressed to prevent a spike output at ACCELERATE Output 82. Output of comparator 43 is connected to DECELERATE output 83 and only becomes active when switch 4 is depressed.

The previous discussion reveals the priority of switch 4 over all others, switch 3 over switches 2 and 1, and switch 2 over switch 1. Thus switch 1 is of least priority. Part of this prioritizing is accomplished in the automotive cruise control as for the RESUME output 81. However, the resistors for each switch must be arranged to provide the intended levels of priority. Table 1, shown below, is a truth table and lists the order of priority and the required values of resistors 5–7, 9 and 21–25.

percent higher than its design value of 12K ohms and resistors 5 through 7 being two percent below their design values of 29K ohms, 9.1K ohm, and 3.3K ohm, respectively.

Figure 2:
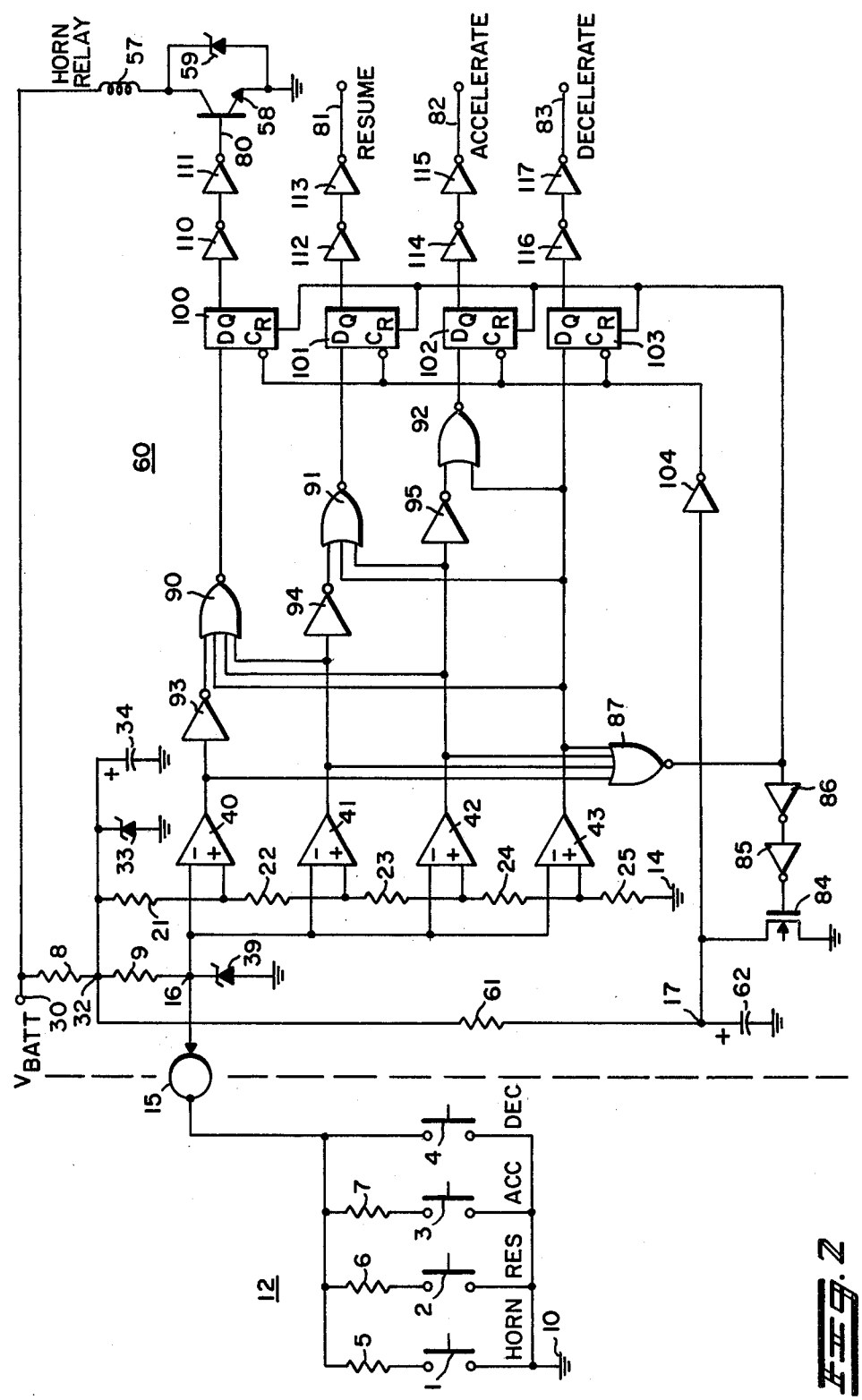
FIG. 2 is a schematic diagram similar to FIG. 1 according to a second embodiment of the invention.

FIG. 2 shows another embodiment of the invention in which additional digital processing eliminates the need for capacitors 44 and 45 of FIG. 1. Further, this additional digital processing produces unambiguous output commands 80, 81, 82 and 83 without the need for further decoding as required in the embodiment shown in FIG. 1. Supply voltage pin 30 inputs $V_{BATT}$. Resistors 8, 9, 21–25, Zener diode 39 and command generation means 12 are the same as depicted in FIG. 1. The circuit

TABLE 1

COMMAND/OUTPUT RELATIONSHIP

| COMMAND SWITCHES | | | | EQUIV RESIST | INPUT VOLTAGE −4% | COMPARATORS | | | | OUTPUTS | | | |
|---|---|---|---|---|---|---|---|---|---|---|---|---|---|
| 4 | 3 | 2 | 1 | | | 43 | 42 | 41 | 40 | 83 | 82 | 81 | 80 |
| φ | φ | φ | φ | ∞ | 9.10 | φ | φ | φ | φ | φ | φ | φ | φ |
| φ | φ | φ | 1 | 39.00K | 6.68 | φ | φ | φ | 1 | φ | φ | φ | 1 |
| φ | φ | 1 | φ | 9.10K | 3.77 | φ | φ | 1 | 1 | φ | φ | 1 | φ* |
| φ | φ | 1 | 1 | 7.38K | 3.33 | φ | φ | 1 | 1 | φ | φ | 1 | φ* |
| φ | 1 | φ | φ | 3.30K | 1.88 | φ | 1 | 1 | 1 | φ | 1 | 1 | φ* |
| φ | 1 | φ | 1 | 3.04K | 1.77 | φ | 1 | 1 | 1 | φ | 1 | 1 | φ* |
| φ | 1 | 1 | φ | 2.42K | 1.47 | φ | 1 | 1 | 1 | φ | 1 | 1 | φ* |
| φ | 1 | 1 | 1 | 2.28K | 1.39 | φ | 1 | 1 | 1 | φ | 1 | 1 | φ* |
| 1 | φ | φ | φ | 0.00 | 0.00 | 1 | 1 | 1 | 1 | 1 | φ** | 1 | φ* |
| 1 | φ | φ | 1 | 0.00 | 0.00 | 1 | 1 | 1 | 1 | 1 | φ** | 1 | φ* |
| 1 | φ | 1 | φ | 0.00 | 0.00 | 1 | 1 | 1 | 1 | 1 | φ** | 1 | φ* |
| 1 | φ | 1 | 1 | 0.00 | 0.00 | 1 | 1 | 1 | 1 | 1 | φ** | 1 | φ* |
| 1 | 1 | φ | φ | 0.00 | 0.00 | 1 | 1 | 1 | 1 | 1 | φ** | 1 | φ* |
| 1 | 1 | φ | 1 | 0.00 | 0.00 | 1 | 1 | 1 | 1 | 1 | φ** | 1 | φ* |
| 1 | 1 | 1 | φ | 0.00 | 0.00 | 1 | 1 | 1 | 1 | 1 | φ** | 1 | φ* |
| 1 | 1 | 1 | 1 | 0.00 | 0.00 | 1 | 1 | 1 | 1 | 1 | φ** | 1 | φ* |

*SPIKE TO "1" ON INITIAL CLOSURE OF SWITCH 2, 3 OR 4.
**SPIKE TO "1" ON INITIAL CLOSURE OF SWITCH 4.

When a switch 1, 2, 3 or 4 is depressed, a resistor 5 through 7 or a short-to-ground potential at node 10 will form a voltage divider with resistor 9 and present this derived voltage at node 16 to the negative input of comparators 40–43. Zener diode 39 is used to suppress transient voltages on the signal line through slip-ring 15 and is selected at a voltage greater than the level at node 32 maintained by Zener 33. Thus Zener diode 39 will not interfere with the voltage divider action of resistor 9 and the command generation means 12.

If two percent tolerance resistors are used for resistors 21–25, and resistors 21 and 25 are 1K ohm, resistor 22 is 3K ohm and resistors 23 and 24 are 2K ohms, then the voltage at the positive inputs of comparators 40–43 will be within the ranges 7.77 to 8.41 volts, 4.85 to 5.26 volts, 2.91 to 3.14 volts, and 0.97 to 1.05 volts, respectively, with Zener diode 33 maintaining a voltage level of 9.1 volts at node 32. The voltage due to the divider caused by resistor 9 and command generation means 12 is ratiometric to the voltage at node 32 as are the voltage levels at the positive inputs of comparators 40–43. Thus the trip points are related to resistor values and not to the voltage at node 32.

The comparators will trip or have their outputs become a logical "1" if the negative input voltage goes below the positive input voltage. It can be appreciated that the desired command outputs are unique in that if one or more command switches 1–4 are depressed, only the highest priority command will be decoded. Resistors 5–7 were selected such that the input voltage to the negative input of comparators 40–43 falls within the desired voltage range as shown in Table 1. The calculated input voltage is reduced four percent to account for the worst case condition of resistor 9 being two 60 also contains four comparators 40–43 and four output commands 80 through 83 as in FIG. 1. A charging resistor 61 is connected between nodes 17 and 32. Capacitor 62 is connected between node 17 and ground node 14. These elements provide a suitable time delay to allow for output latching without the switching transient formerly suppressed by capacitors 44 and 45 as shown in the embodiment of FIG. 1.

The outputs of comparators 40–43 are connected to each of four inputs of NOR gates 87 whose output drives an N-channel field effect transistor 84 through two inverters 85 and 86. The N-channel field effect transistor 84 could also be an NPN transistor in bipolar technology. When any output of the comparators 40–43 is active, the device 84 will turn off and allow external capacitor 62 to charge via resistor 61 as long as the command is present. This charge is sensed by inverter 104 whose input is connected to the external capacitor 62 and whose output is connected to the four separate clock inputs of latches 100–103. These latches transfer the logical state at their data input "D" to their output "Q" when the signal at the clock input "C" falls to a low potential. This will occur after the external capacitor 62 has charged, and invertor 104 converts this into a logic level "φ". This action cannot reoccur until all the commands are in their off state thus allowing external capacitor 62 to discharge via N-channel transistor 84 being turned on. When all commands are off, i.e., switches 1–4 are open, the latches 100–103 are reset by NOR gate 87.

Logic gates 90–95 provide an exclusive decode of the highest priority input command received at the INPUT pin at node 16. Since there is some delay in charging external capacitor 62, the decoded command is set up at the data inputs of latches 100-103 before the clock input falls, thereby eliminating switching spikes at signal outputs 80-83. Table 2, shown below, is the truth table for this logic embodiment,.

TABLE 2

| COMMAND/OUTPUT RELATIONSHIP | | | | | | | | | | | | | |
|---|---|---|---|---|---|---|---|---|---|---|---|---|---|
| COMMAND SWITCHES | | | | EQUIV. RESIST | INPUT VOLTAGE −4% | COMPARATORS | | | | OUTPUTS | | | |
| 4 | 3 | 2 | 1 | | | 43 | 42 | 41 | 40 | 83 | 82 | 81 | 80 |
| φ | φ | φ | φ |         | 9.10 | φ | φ | φ | φ | φ | φ | φ | φ |
| φ | φ | φ | 1 | 39.00K  | 6.68 | φ | φ | φ | 1 | φ | φ | φ | 1 |
| φ | φ | 1 | φ | 9.10K   | 3.77 | φ | φ | 1 | 1 | φ | φ | 1 | φ |
| φ | φ | 1 | 1 | 7.38K   | 3.33 | φ | φ | 1 | 1 | φ | φ | 1 | φ |
| φ | 1 | φ | φ | 3.30K   | 1.88 | φ | 1 | 1 | 1 | φ | 1 | φ | φ |
| φ | 1 | φ | 1 | 3.04K   | 1.77 | φ | 1 | 1 | 1 | φ | 1 | φ | φ |
| φ | 1 | 1 | φ | 2.42K   | 1.47 | φ | 1 | 1 | 1 | φ | 1 | φ | φ |
| φ | 1 | 1 | 1 | 2.28K   | 1.39 | φ | 1 | 1 | 1 | φ | 1 | φ | φ |
| 1 | φ | φ | φ | 0.00    | 0.00 | 1 | 1 | 1 | 1 | 1 | φ | φ | φ |
| 1 | φ | φ | 1 | 0.00    | 0.00 | 1 | 1 | 1 | 1 | 1 | φ | φ | φ |
| 1 | φ | 1 | φ | 0.00    | 0.00 | 1 | 1 | 1 | 1 | 1 | φ | φ | φ |
| 1 | φ | 1 | 1 | 0.00    | 0.00 | 1 | 1 | 1 | 1 | 1 | φ | φ | φ |
| 1 | 1 | φ | φ | 0.00    | 0.00 | 1 | 1 | 1 | 1 | 1 | φ | φ | φ |
| 1 | 1 | φ | 1 | 0.00    | 0.00 | 1 | 1 | 1 | 1 | 1 | φ | φ | φ |
| 1 | 1 | 1 | φ | 0.00    | 0.00 | 1 | 1 | 1 | 1 | 1 | φ | φ | φ |
| 1 | 1 | 1 | 1 | 0.00    | 0.00 | 1 | 1 | 1 | 1 | 1 | φ | φ | φ |

Inverters 110-117 buffer and isolate the latched outputs from the external circuitry. Thus this circuit not only has a built-in time delay to filter out unwanted signal inputs but also has unique output states without the need for external decoding and does not produce output spikes as does the less complex circuit shown in FIG. 1.

FIG. 3 shows another embodiment of the invention. All the decoding and signal processing circuitry is included within custom IC 60 to simplify the final packaging and to help make it more suitable for an automotive environment. External transistor 58 and Zener diode 59 are used to supply the necessary power to control horn relay 57. All other components and functions are the same as described in FIG. 2.

By the above-described invention there is provided a new and improved system for transmitting a selected one of a plurality of commands to be multiplexed via a single slip-ring. It will be appreciated that this is highly desireable especially in steering wheel systems having cruise control.

What is claimed is:

1. A system for transmitting a selected one of a plurality of commands to be multiplexed and decoded to control output devices comprising:
first circuit means including a plurality of independent actuating switches;
second circuit means for generating a plurality of voltage signals in response to the condition of said actuating switches;
slip-ring means for receiving said voltage signals and supplying them to a third circuit means;
a plurality of output devices operative in response to voltage signals from said third circuit means;
said third circuit means including decoding logic means to produce a selected one of plurality of output signals corresponding to the condition of said independent actuating switches to energize a predetermined one of said output devices;
said decoding logic means including timed latch gates to eliminate switching transients from said preselected output signals.

2. A system according to claim 1 wherein said second circuit means produces an output voltage level indicative of the enabled actuating switch.

3. A system according to claim 2 wherein said output voltage level is decoded by said decoding logic means to produce a plurality of independent outputs only one of which is active depending upon which actuating switch is enabled.

4. A system for transmitting a selected one of a plurality of commands to be multiplexed and decoded to control output devices comprising:
first circuit means including a plurality of independent actuating switches;
second circuit means for generating a plurality of voltage signals in response to the condition of said actuating switches;
wherein the voltage signals from said second circuit means are ratiometric to a plurality of reference voltage signals derived from a common voltage node coupled to said first and second circuit means;
slip-ring means for receiving said voltage signals and supplying them to a third circuit means;
a plurality of output devices operative in response to voltage signals from said third circuit means;
said third circuit means including decoding logic means to produce a selected one of plurality of output signals corresponding to the condition of said independent actuating switches to energize a predetermined one of said output devices.

5. A system according to claim 4 wherein said second circuit means produces an output voltage level indicative of the enabled actuating switch.

6. A system according to claim 5 wherein said output voltage level is decoded by said decoding logic means to produce a plurality of independent outputs only one of which is active depending upon which actuating switch is enabled.

* * * * *